US009921460B2

(12) United States Patent
Yamaguchi et al.

(10) Patent No.: US 9,921,460 B2
(45) Date of Patent: Mar. 20, 2018

(54) STORAGE CASE TO ACCOMMODATE A PROJECTOR AND TO MOVE THE PROJECTOR UP AND DOWN

(71) Applicants: Hiroshi Yamaguchi, Kanagawa (JP); Takanobu Tanaka, Kanagawa (JP); Kunihiko Abe, Saitama (JP); Yoshishige Tanaka, Tokyo (JP); Seigoh Nishiyama, Kanagawa (JP); Yuichi Takamiya, Kanagawa (JP)

(72) Inventors: Hiroshi Yamaguchi, Kanagawa (JP); Takanobu Tanaka, Kanagawa (JP); Kunihiko Abe, Saitama (JP); Yoshishige Tanaka, Tokyo (JP); Seigoh Nishiyama, Kanagawa (JP); Yuichi Takamiya, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/154,267

(22) Filed: May 13, 2016

(65) Prior Publication Data
US 2016/0252802 A1 Sep. 1, 2016

Related U.S. Application Data

(63) Continuation of application No. PCT/JP2014/079484, filed on Nov. 6, 2014.

(30) Foreign Application Priority Data

Nov. 22, 2013 (JP) ................................ 2013-242116

(51) Int. Cl.
*G03B 21/14* (2006.01)
*G03B 21/10* (2006.01)
(Continued)

(52) U.S. Cl.
CPC .......... *G03B 21/145* (2013.01); *G03B 21/10* (2013.01); *G03B 21/142* (2013.01); *G03B 21/54* (2013.01); *H04N 9/3141* (2013.01); *G03B 21/28* (2013.01)

(58) Field of Classification Search
CPC .... G03B 21/10; G03B 21/142; G03B 21/145; G03B 21/54; G03B 21/28; H04N 9/3141
See application file for complete search history.

(56) References Cited

U.S. PATENT DOCUMENTS 5,285,287 A 2/1994 Shikama
7,106,014 B1 * 9/2006 Mastalir ................ A47B 19/06
108/44
(Continued)

FOREIGN PATENT DOCUMENTS

JP H04-366936 12/1992
JP 2001-275729 10/2001
(Continued)

OTHER PUBLICATIONS

International Search Report dated Jan. 20, 2015 in PCT/JP2014/079484 filed on Nov. 6, 2014 (with English translation).
(Continued)

*Primary Examiner* — Sultan Chowdhury
*Assistant Examiner* — Magda Cruz
(74) *Attorney, Agent, or Firm* — Oblon, McClelland, Maier & Neustadt, L.L.P.

(57) ABSTRACT

A storage case includes a storage space accommodating a projector, a cover body configured to open or close an upper opening of the storage space, an elevating mechanism provided in the storage space and configured to move the projector up and down, and an adjusting mechanism configured to adjust a projection direction of the projector moved up by the elevating mechanism.

13 Claims, 11 Drawing Sheets

(51) Int. Cl.
*H04N 9/31* (2006.01)
*G03B 21/54* (2006.01)
*G03B 21/28* (2006.01)

(56) References Cited

U.S. PATENT DOCUMENTS

| | | | |
|---|---|---|---|
| 2002/0063072 A1* | 5/2002 | Pham | A45C 5/14 206/320 |
| 2005/0035517 A1 | 2/2005 | Lawrence et al. | |
| 2006/0255522 A1 | 11/2006 | Lawrence et al. | |
| 2007/0108683 A1 | 5/2007 | Lawrence et al. | |
| 2012/0205848 A1 | 8/2012 | Lawrence et al. | |

FOREIGN PATENT DOCUMENTS

| | | |
|---|---|---|
| JP | 2005-092060 | 4/2005 |
| JP | 2006-047893 | 2/2006 |
| JP | 2006-55488 A | 3/2006 |
| JP | 3120598 U | 4/2006 |
| JP | 2007-296278 | 11/2007 |
| JP | 2009-239808 | 10/2009 |
| JP | 2014-178375 | 9/2014 |
| WO | WO 2005/016601 A2 | 2/2005 |

OTHER PUBLICATIONS

Written Opinion dated Jan. 20, 2015 in PCT/JP2014/079484 filed on Nov. 6, 2014.
Office Action dated May 23, 2017 in Japanese Patent Application No. 2015-549068.

* cited by examiner

STORAGE CASE TO ACCOMMODATE A PROJECTOR AND TO MOVE THE PROJECTOR UP AND DOWN

CROSS-REFERENCE TO RELATED APPLICATIONS

This application is a continuation application filed under 35 U.S.C. 111(a) claiming the benefit under 35 U.S.C. 120 and 365(c) of PCT International Application No. PCT/JP2014/079484 filed on Nov. 6, 2014, which is based upon and claims the benefit of priority of Japanese Patent Application No. 2013-242116 filed on Nov. 22, 2013, the entire contents of which are incorporated herein by reference.

BACKGROUND OF THE INVENTION

1. Field of the Invention

The present invention generally relates to a storage case storing a projector.

2. Description of the Related Art

As an example of a storage case storing a projecting apparatus such as a projector, a storage case including a case main body and a cover body that is openably and closably connected to the case main body with a hinge, the case main body having storage spaces so as to respectively store extendable legs and a projector therein (see for example, "Patent Document 1"). This storage case can be used to store and carry the projector and also can be used as a placing part for placing the projector by opening the case main body and the cover body thereof and extending the legs when the projector is used to project an image.

Patent Document 1: Japanese Laid-Open Patent Publication No. 2007-296278

SUMMARY OF THE INVENTION

However, the storage case in Patent Document 1 has some problems. First, it is not possible to adjust the height when the storage case is used as the placing part of the projector. Therefore, it is not possible to adjust a projection direction to properly project an image onto a screen, onto which the image is projected, or a height position of a white wall. Further, when the projector is used, it is necessary to pull out the legs stored in the case main body and adjust the length of the legs so that the height of the rear surface of the case main body is equal to the height of the rear surface of the cover body. Therefore, it takes time to prepare and a use starting time is delayed when the projector is used at a visiting destination.

For example, in consideration of the above problem, an object of the embodiment is to provide a storage case, which can be supported so as to have an appropriate projection height and a projection direction within a short time at a location where the storage case is installed.

To solve the above problem, the present invention has the following means.

One aspect of the embodiments of the present invention may be to provide a storage case including a storage space accommodating a projector; a cover body configured to open or close an upper opening of the storage space; an elevating mechanism provided in the storage space and configured to move the projector up and down; and an adjusting mechanism configured to adjust a projection direction of the projector moved up by the elevating mechanism.

Additional objects and advantages of the embodiments will be set forth in part in the description which follows, and in part will be made clear from the description, or may be learned by practice of the invention. Objects and advantages of the invention will be realized and attained by means of the elements and combinations particularly pointed out in the appended claims.

DETAILED DESCRIPTION OF THE PREFERRED EMBODIMENTS

A description is given below, with reference to the FIG. 1 through FIG. 11B of embodiments of the present invention. Where the same reference symbols are attached to the same parts, repeated description of the parts is omitted.

Reference symbols typically designate as follows:
10, 10A, 10B: storage case;
12: case main body;
13: storage space;
14: shoulder belt;
18: cover body;
20: projector;
21: chassis;
22: projection section;
23: connection section;
24, 26: exhaust heat opening;
25: operation switch;
30: accessory;
40: main battery;
42: battery cartridge;
60: wheel;
60, 600: supporting rod;
61, 601: gripping part;

70: elevating mechanism;
71: supporting rod;
72: elevating part;
80: first height locking mechanism;
90: angle adjusting mechanism (adjusting mechanism);
91: bracket part;
92: rotation part;
93: first angle locking mechanism;
100: projection surface;
300, 301: display part;
310: reflection plate;
311: first fixing part;
312: second fixing part;
313: chain;
314, 315: screw.

Hereinafter, preferred embodiments of the present invention are explained with reference to accompanying drawings. In the following explanation, the same or corresponding reference symbols are attached to the same or corresponding apparatuses, devices, parts, members or the like, and overlapping explanation is omitted. Further, relative ratios among the members and parts are not considered in the figures. Therefore, specific dimensions can be determined by a person ordinarily skilled in art in light of the non-limiting embodiments described below.

First Embodiment

Figure 1A:
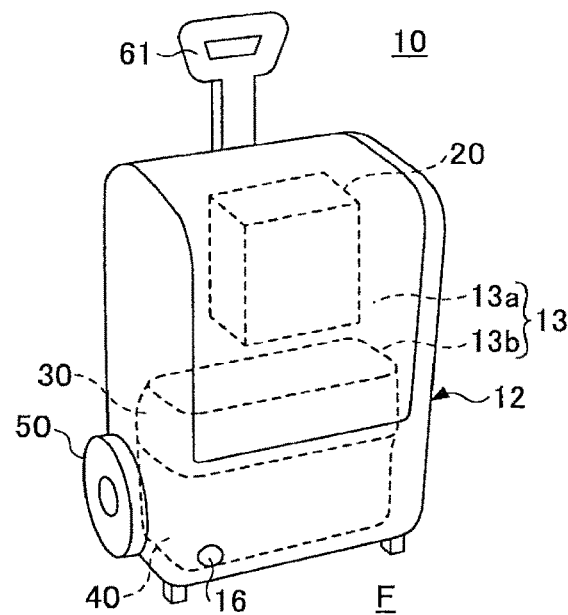
FIG. 1A perspectively illustrates an example storage case according to a first embodiment.
Figure 1B:
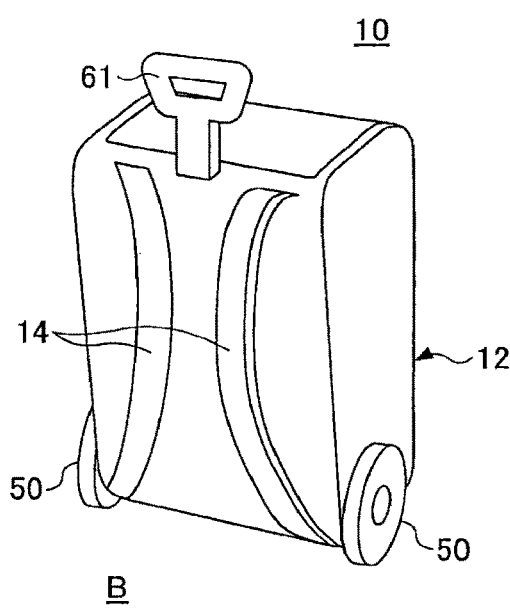
FIG. 1B perspectively illustrates an example storage case according to a first embodiment.

FIGS. 1A and 1B perspectively illustrate a storage case in a state of moving or storing in the storage case according to a first embodiment of the present invention. As shown in FIGS. 1A and 1B, the exterior of a storage case 10 is formed by sewing a resin material or a resin sheet so as to be a water-proof and drip-proof storage case. Further, the case main body 12 includes a storage space 13 therein to store a projector 20, various accessories 30, a main battery 40, and so on. Here, the storage space 13 includes a first storage room 13a storing the projector 20 and a second storage room 13b storing the main battery 40.

On the bottom part of the case main body 12, wheels 50 are provided at the left and right sides. Further, on the upper center side of the case main body 12, a gripping part 61 is provided to be gripped to carry the storage case 10. To that end, the wheels 50 are formed such that the diameter thereof is relatively large at the sacrifice of increase of the weight. By doing this, when the storage objects are stored in the storage space 13, it is easy to move the storage case 10 through a step by gripping the gripping part 61.

Further, the storage case 10 includes a shoulder belt 14 on a back side thereof to be used when the storage case 10 is shouldered. By having the shoulder belt 14, it becomes possible to shoulder the storage case 10 by disposing the shoulder belts 14 over the respective shoulders when it is necessary to carry the storage case 10 on a rough dirt road or when a two-wheeled vehicle such as a bicycle is used to carry the storage case 10.

Further, on a front side of the case main body 12, there is formed a power supply outlet 16 connected to the battery 40. The power supply outlet 16 is used to supply power to an electronic apparatus (e.g., a personal computer or a tablet terminal) which is not the projector stored inside the case main body 12.

[Structure of Projector 20]

Figure 2A:
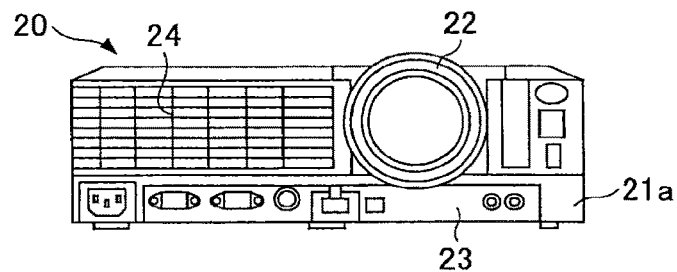
FIG. 2A illustrates an example configuration of a projector.
Figure 2B:
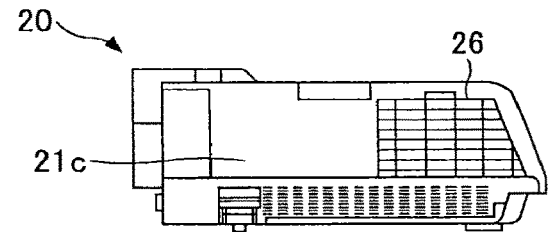
FIG. 2B illustrates an example configuration of the projector.
Figure 2C:
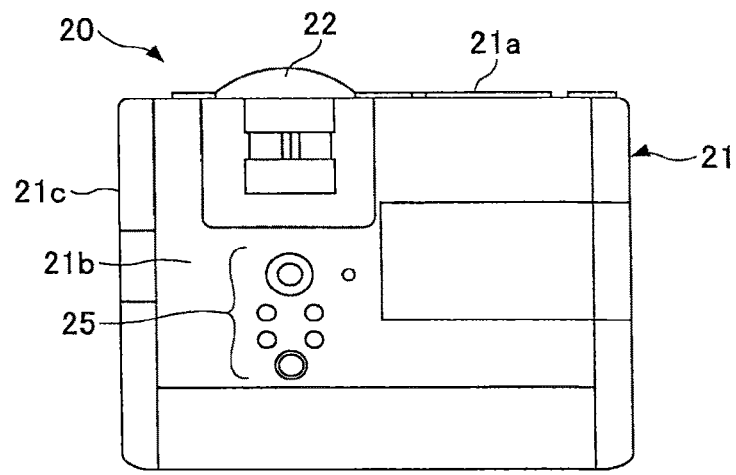
FIG. 2C illustrates an example configuration of the projector.

FIGS. 2A through 2C illustrate an example configuration of the projector 20. As shown in FIGS. 2A through 2C, the projector 20 has a compact size and a light weight so as to be portable. The projector 20 includes a projection section 22 including an optical unit including a lens for projecting an image, a connection section 23 having various connection connectors, and an exhaust heat opening 24, which are formed on a front surface 21a of a chassis 21. Various operation switches 25 are provided on an upper surface 21b of the chassis 21, and an exhaust heat opening 26 and so on are provided on a left side surface 21c of the chassis 21.

The projection section 22 is formed on the front surface 21a of the projector 20. Therefore, an image is projected in a forward direction from a position close to the screen or a white wall, which is a projection surface. However, the projector 20 is not limited to a form where the projection section 22 is formed on the front surface of the projector 20. The projector 20 may have another form.

[Using State of Projector 20]

Figure 6:
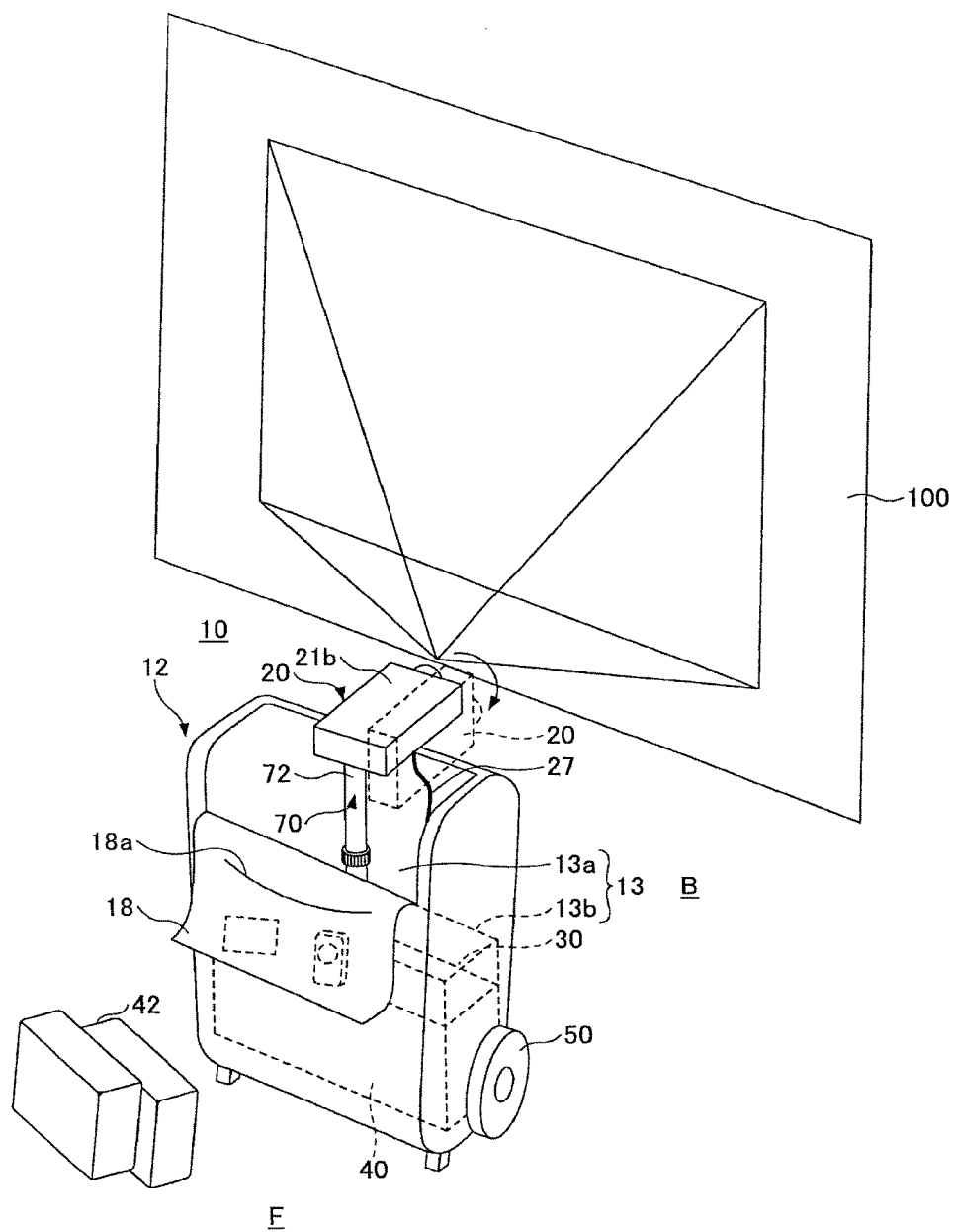
FIG. 6 perspectively illustrates a state where the lifted-up projector projects an image.

FIG. 6 perspectively illustrates a using state of the projector 20 where the projector 20 stored in the storage case 10 is moved up. As shown in FIG. 6, the upper side and the front side F of the storage space 13 are open when a cover body 18 for covering the upper opening of the case main body 12 is open. Then, the projector 20 stored inside the storage case 10 is exposed. The cover body 18 includes a fastening member such as a fastener, hooks, buttons or the like, so that the cover body 18 is openably and closably attached to the case main body 12. Further, it is preferable that a storage pocket 18a is provided on the back surface of the cover body 18 to store small objects such as cables.

Further, there is a manual elevating mechanism 70 that causes the projector 20 to be raised inside the case main body 12.

When the projector 20 stored in the storage space 13 of the case main body 12 is used, the projector 20 is moved up by the elevating mechanism 70 so as to be held at a height position where the projector 20 can project. The elevating mechanism 70 guides the moving up and down operations of an elevating part 72 as described below. Further, when the elevating part 72 is moved to the height position where the projector 20 can project, a first locking mechanism 80 (see FIGS. 3 and 4) is used to lock the height position of the elevating part 72.

Further, when the cover body 18 is open, the various accessories 30 such as a solar panel stored in the bottom part of the storage space 13, the main battery 40, and a battery cartridge 42 can be taken out from the storage space 13. Further, a power cable 27 of the projector 20 is connected to the main battery 40. When the elevating part 72 is moved up and locked at the height position for the projection and a projection direction is adjusted by an angle adjusting mechanism 90 (see FIG. 3) as an adjusting mechanism described below, the projector 20 is ready to project. Then, the projector 20 projects a projection image onto a projection surface 100 toward a back surface side B.

The main battery 40 is rechargeable so that the main battery 40 supplies power not only to the projector 20 but also to a personal computer that inputs the projection image to be projected. Further, in the storage space 13, multiple battery cartridges 42 as preliminary power units are also stored. Therefore, when the remaining amount of the energy in the main battery 40 is low, the power supply from the battery cartridges 42 enables the projection to be continued while the main battery 40 is charged.

[Configuration of Elevating Mechanism 70]

Figure 3:
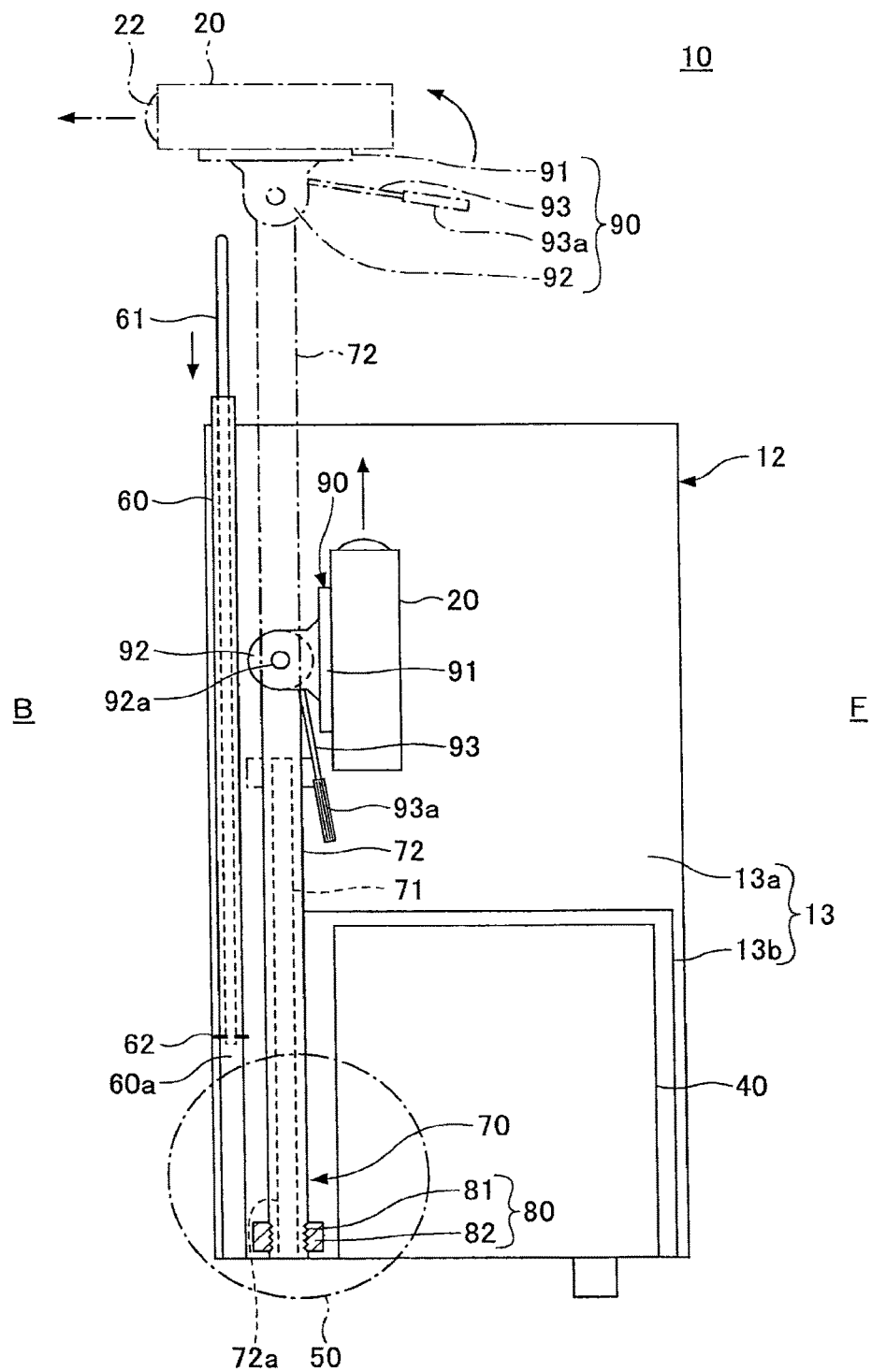
FIG. 3 is a cross-sectional view of an elevating mechanism of a storage case.
Figure 4:
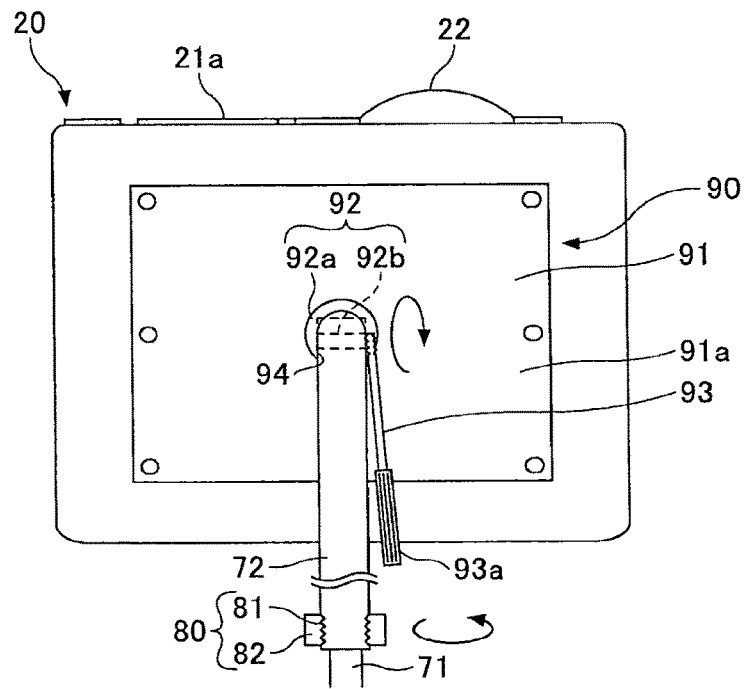
FIG. 4 is a back view of an angle adjusting mechanism.
Figure 5:
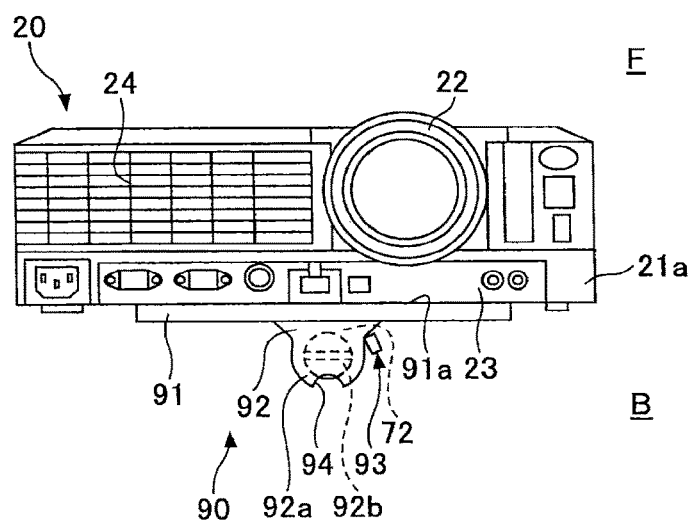
FIG. 5 is a plan view of the angle adjusting mechanism viewed from an upper side.

FIG. 3 is a side cross-sectional view of an example of the elevating mechanism of the storage case 10. FIG. 4 is a back view of an example of the elevating part 72 of the elevating mechanism 70. FIG. 5 is a plane view of the example of the elevating part 72 shown in FIG. 4 viewed from an upper side.

As shown in FIGS. 3 and 4, the elevating mechanism 70 includes a supporting rod 71, the elevating part 72, a first height locking mechanism 80, and guides the projector 20 to be moved above the upper opening.

The elevating part 72 is a pipe member shaped like a circle in a horizontal cross-sectional view. A supporting rod 71 can be accommodated inside the hollow part 72a so as to move up and down in the vertical directions within a range of the height of the supporting rod 71. The supporting rod 71 accommodated in the elevating part 72 is a pipe member shaped like a circle in a cross-sectional view, stands closer to an inner wall of the storage space 13, and connected to a bottom portion of the case main body 12 at a lower end of the supporting rod 71. The height of the supporting rod 71 is determined in relationship with the elevating part 72 because the height of the supporting rod 71 is proportional to an elevation range of the elevating part 72. Therefore, the height is not limited to the illustration of FIG. 4. An angle adjusting mechanism 90 is provided at an upper position of the elevating part 72. The projector 20 is connected to the angle adjusting mechanism 90. The angle adjusting mechanism 90 is described later. A first height locking mechanism 80 is provided at a lower end of the elevating part 72. The first height locking mechanism 80 locks to fix the elevating part 72 to the supporting rod 71 when the elevating part 72 is in a position where the projector 20 can project (a moved-up position illustrated by a dot chain line).

[Configuration of First Height Locking Mechanism 80]

Referring to FIGS. 3-4, described next is the above first height locking mechanism 80 (hereinafter, simply referred to as a height locking mechanism 80). The height locking mechanism 80 includes a groove portion 81 and a nut portion 82. The groove portion 81 is provided (engraved) at a peripheral position of a lower end portion of the elevating part 72, and the nut portion 82 to screw in the groove portion 81. Although it is omitted from illustration, it is preferable to provide the supporting rod 71 with multiple incisions arranged in the vertical direction of the supporting rod 71. Therefore, the height position of the elevating part 72 is locked by firmly tightening a space between the elevating part 72 and the supporting rod 71 by a rotation of the nut portion 82 as illustrated in FIG. 4 after moving the elevating part 72 to a projection height of the projector 20. At this time, the width of the incisions provided in the supporting rod 71 is contracted by a tightening force by the nut portion 82 so as to obtain a firm holding force.

The configuration of the first height locking mechanism 80 is not limited 10 those illustrated in FIGS. 3 and 4. It may be configured such that multiple graduated through holes are provided in the vertical direction of the outer peripheral surface of the supporting rod 71, multiple graduated through holes are provided in the vertical direction of the outer peripheral surface of the elevating part 72, and positions of the through holes are caused to be overlapped, so that a pin is inserted into the overlapped through holes to secure the height position. Said differently, it is possible to use a mechanism of fixing the elevating part 72 to the predetermined position.

[Configuration of Gripping Part 61]

As illustrated in FIG. 3, the storage space 13 is provided with a supporting rod 60 vertically extending so as to follow the inner wall and a gripping part 61 moved up and down relative to the supporting rod 60.

The supporting rod 60 is formed in a hollow rectangular shape including a hollow part 60a having a larger size in its width direction. The plate-shape gripping part 61 is inserted in the hollow part 60a so as to be able to move up and down. The lower end of the supporting rod 60 is connected to a bottom part of the case main body 12. The upper end of the supporting rod 60 protrudes over the case main body 12. Because the gripping part 60 is slidably engaged with the hollow part 60a of the supporting rod 60, the height position in the up and down direction of the gripping part 61 can be adjusted by sliding the gripping part 61 in the hollow part 60a of the supporting rod 60. It is preferable to provide a second height locking mechanism 62 for fixing the height position of the gripping part 61. Various locking mechanisms ordinarily used for the gripping part of storage cases are applicable to this locking mechanism 62. For example, the second locking mechanism 62 may be a locking mechanism in which a protrusion part effecting a prompting force in an orthogonal direction is provided at a lower end portion of the gripping part 61, multiple holes enabled to engage with the protrusion part are formed on the outer peripheral surface of the supporting rod in the horizontal direction, and the protrusion part and the holes are engaged at a predetermined height position. It may be configured such that the prompting force of the protrusion part is cancelled by pushing a cancellation button, which is provided in an upper edge portion of the gripping part 61 so as to be connected to the protrusion portion, for example, and then the gripping part 61 can be moved up and down.

[Configuration of Angle Adjusting Mechanism 90]

As illustrated in FIGS. 3 to 5, the angle adjusting mechanism 90, which is provided at an upper position of the elevating mechanism 70, supports the projector 20, and functions as an angle adjusting mechanism 90 being an adjusting mechanism for adjusting the projection direction.

The angle adjusting mechanism 90 includes a bracket part 91 for supporting the projector 20, a rotation part 92 for adjusting the angle of the bracket part 91, and a first angle locking mechanism (hereinafter, simply referred to as an angle locking mechanism 93) for preventing rotation of the rotation part 92 to fix the angle of the projector 20.

Referring to FIGS. 4 and 5, the bracket part 91 has a flat surface part 91a in a plate-like shape. The projector 20 is fixed to and supported by the flat surface part 91a by using screws, for example.

The rotation part 92 includes a bearing part extending from a center position of the back surface of the above flat surface part 91a and a shaft part 92b that is provided at the upper edge portion of the elevating part 77 and is arranged to cross in an orthogonal direction to the elevating part 77. The lower side of the bearing part 92a opens, and has a semi-arc shape having the hollow portion. The upper edge portion of the elevating part 72 is accommodated inside the hollow portion and is connected to the bearing part 92a so that the bearing part 92a is rotatable in up and down directions relative to the elevating part 72 around the shaft part 92b. The shaft part 92b is a pin penetrating a through hole which is provided at an upper end part of the elevating part 72 and formed to penetrate in the horizontal direction 72. Further, the bearing part 92a has a cut portion 94 within a predetermined movable range to allow rotation relative to the elevating part 72.

The angle locking mechanism 93 performs locking when an operation handle 93a is turned in one direction and is released from the locking when the operation handle 93a is turned in the other direction. When an operator grips the operation handle 93a and causes the operation handle 93a to turn in the one direction relative to the rotation part 92, the width of the bearing part 92 decreases so that the bearing part 92 fixed by pressure to the elevating part 72.

When the operator causes the operation handle 93a to turn in the other direction relative to the rotation part 92, the width of the bearing part 92 returns to the original position to enable the rotation. The angle locking mechanism 93 has a function of performing an angle adjusting operation by moving the operation handle 93a in the up and down directions in addition to the above locking function.

The angle adjusting mechanism 90 is not limited to the above configuration. It is preferable to employ a ball joint structure as the rotation part so as to freely rotatable in directions of 360 degrees. A configuration of rotating in the three-dimensional directions as used in a camera platform of a tripod for a camera may be employed.

Thus, the angle of the projector 20 can be freely adjusted at an arbitrary angle, at which the projector 20 supported by the bracket part 91 projects the image, by the angle adjusting mechanism 90.

Said differently, when the angle adjusting mechanism 90 and the elevating part 72 are fixed to the predetermined height position, the projector 20 is in a state where the projection section 22 exists on the upper side. Therefore, at first, the locked state of the first angle locking mechanism 93 is released, and the projector 20 is rotated in the up and down directions by the rotation part 92 by about 90 degrees so that the projection section 22 is arranged in the horizontal direction as indicated by a dot chain line of FIG. 3. In this state, the operation handle 93a is turned around the shaft to lock the angle locking mechanism 93 and fix the angle. Referring to FIG. 4, the locking of the first height locking mechanism 80, which is provided at the low end of the elevating part 72, is released to rotate the elevating part 72 in the axial direction so as to do a fine adjustment of the projector 20 in the horizontal direction.

[Procedure of Height Adjustment Operation and Procedure of Angle Adjustment Operation of Projector 20]

Next, procedures of a height adjustment operation and an angle adjustment operation of the projector 20 are briefly described.

Referring to FIG. 3, the projector 20 is accommodated in the storage space 13 of the case main body 12 of the storage case 10. In this accommodation state, the projector 20 can be carried while the projector 20 is accommodated inside the storage case 10. When the projector 20 is used, an upper opening of the case main body 12 is made open by opening the cover body 18 (step 1). The projector 20 stored in the case main body 12 can be moved up and down (see FIG. 6). At this time, the gripping part 61 is slid downward to a height position, at which an installation of the projector 20 is not prevented.

Next, the elevating part 72 of the elevating mechanism 70 is pulled upward (step 2). The first height locking mechanism 80 of the elevating part 72 is released from locking when the projector 20 is accommodated in the case main body 12. Therefore, the elevating part 72 can be smoothly lifted up. However, the first height locking mechanism 80 of the elevating part 72 may be locked. After the elevating part 72 is smoothly caused to be lifted up along the supporting rod 71 to reach a predetermined height, the height is fixed by fastening the nut portion 82 of the height locking mechanism 80 (step 3). At this time, the projection section 22 of the projector 20 directs upward.

Then, the operation handle 93a of the first angle locking mechanism 93 is turned in the one direction to release from the locked state. Then, the rotation part 92 is rotated approximately a 90 degree (step 4). Thus, the projector 20 moves in a horizontal state indicated by the dot chain line in FIG. 3. Said differently, the projection section 22 is arranged to be forward directed. Then, the projection direction can be adjusted to a good position. At the above position, the operation handle 93a of the first angle locking mechanism 93 is turned in the adverse direction and fixed (step 5). Further, in a case where the fine adjustment of the projector 20 in the horizontal direction is performed as described above, the locking of the first height locking mechanism 80 provided at the lower end of the elevating part 72 is released, and the elevating part 72 is swung around the axis.

At this time, because the projector 20 is in a form of forward projecting the image, the storage case 10 is installed at a position close to a screen or a white wall. Then, it is possible to project contents onto the projection surface 100 from the position where the storage case 10 is put. At this time, in a case where the angle adjusting mechanism 90 can turn in the three dimensional direction, the projector 20 may be arranged so as to be further turned by 90 degrees from a solid line illustrated in FIG. 6 relative to the horizontal axis of the projection direction. In this arrangement, the upper surface 21b becomes a side (a right side surface in FIG. 6). This arrangement enables projection of vertically long content in a portrait orientation as illustrated by a broken line 20. At this time, the projector 20 detects an installation state of the projector 20 by a sensor installed inside the projector 20. Thus, the projection image can be projected in a display mode corresponding to the installation state.

As described above, in the storage case 10, the elevating part 72 is lifted up to bring the projector 20 at a predetermined height position above the case main body 12, and the direction of the projector 20 is adjusted to an appropriate projection direction by an easy method and locked. Therefore, an operation of adjusting the leg length in the conventional technique (see Patent Document 1) is not necessitated. Accordingly, a preparation operation for enabling to use the projector can be drastically simplified and a preparation time can be shortened.

After finishing the projection, steps 1 to 5 are done in the reverse order. Said differently, the locking of the first angle locking mechanism 93 is released, the rotation part 92 is turned by about 90 degrees so that the projection section 22 of the projector 20 directs upward, and then the projection section 22 is fixed at the position by the angle locking mechanism 93.

Further, the locking of the first height locking mechanism 80 provided at the lower end of the elevating part 72 is released, and the elevating part 72 is moved downward along the supporting rod 71. After the elevating part 72 is moved downward, the elevating part 72 and the supporting rod 71 are properly locked by the first height locking mechanism 80. However, the locking of the elevating part 72 and the supporting rod 71 in not indispensable.

Further, within the first embodiment, a deceleration means that provides friction resistance (braking force) to the supporting rod 72 may be added in order to reduce the moving-down speed of the elevating part 72. By using the deceleration means, when an operator wrongly separates the hand from the elevating part 72 in a locking releasing state, it becomes possible to alleviate the impact caused by dropping the elevating part 72 and prevent the projector 20 from being damaged due to the dropping.

Second Embodiment

Figure 7:
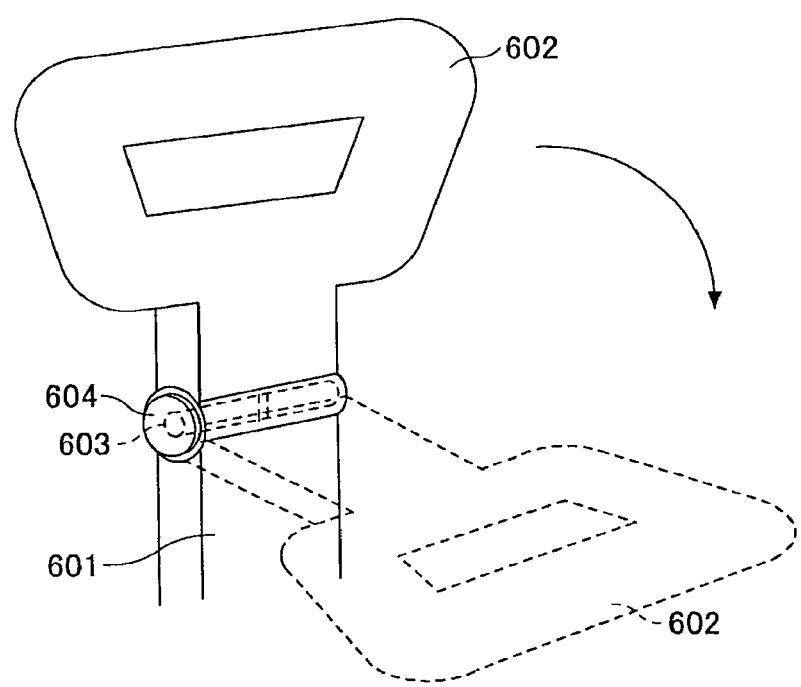
FIG. 7 perspectively illustrates a state where a supporting part is bent.
Figure 8:
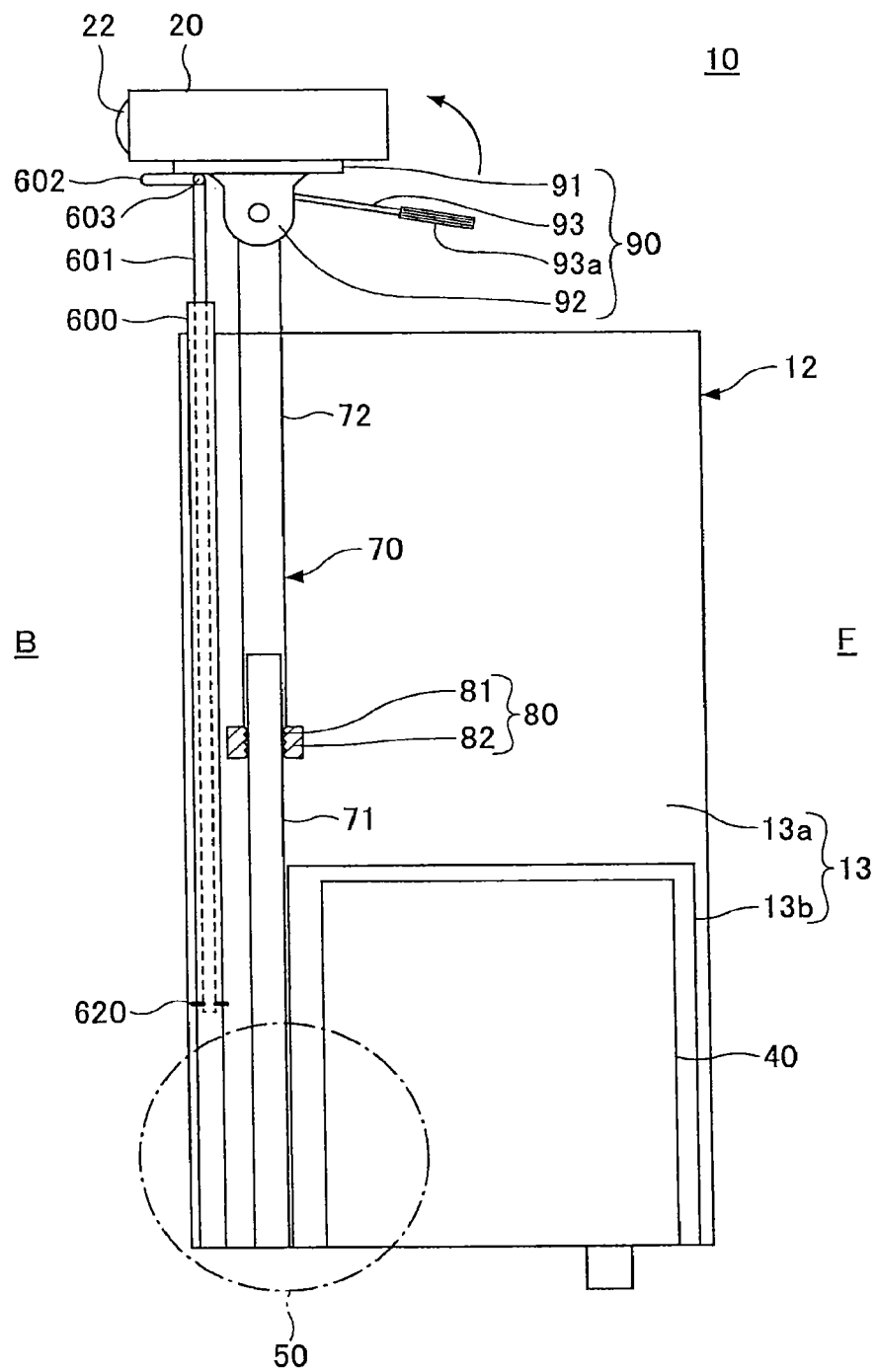
FIG. 8 is a cross-sectional view of an example projector mounted on an upper surface of a supporting part FIG. 9A perspectively illustrates an exemplary storage case provided with a display part.

FIGS. 7 and 8 illustrate a second embodiment of the present invention. FIG. 7 is a schematic view illustrating a structure of the supporting part provided at the upper end portion of the gripping part.

The second embodiment is based on an technical idea substantially similar to that of the first embodiment. Hereinafter, features of the invention different from the first embodiment are described.

The features of the invention different from the first embodiment reside in the configuration of the upper end portion of the gripping part 601. The configuration of the supporting rod 600 including the gripping part 601 is the same as the configuration of the supporting rod 60 illustrated in FIG. 3.

A hand grip portion 602, a rotation part 603, and a second angle locking mechanism 604 are provided at the upper end portion of the gripping part 601. The hand grip portion 602 is provided so as to be able to fold in the orthogonal direction and supports the projector 20 by mounting the projector 20 on the upper surface of the folded hand grip portion 602. The rotation part 603 enables the hand grip portion 602 to fold. The second angle locking mechanism 604 (hereinafter, simply referred to as an angle locking mechanism 604) locks the rotation part 603 to fix the angle of the hand grip portion 602. Within the second embodiment, the hand grip portion 602 has not only a function of a grip at a time of carrying the storage case but also a function of supporting the projector 20.

The angle locking mechanism 604 is configured to release locking by, for example, an operation of a push button, and is internally connected to the rotation part 603. By pushing a push button of the angle locking mechanism 604, the locked state of the rotation part 603 is released to allow the rotation. When the hand grip portion 602 is rotated so as to fold by 90 degrees (at the position of the horizontal state), a stopper function built in the angle locking mechanism 604 is activated to stop the rotation. Then, if the push button of the angle locking mechanism 604 is released at the rotation position, the rotation part 603 is locked and fixed to the above folded position (the rotated position). In order to return the hand grip portion 602 to the vertical position, it is sufficient to perform the above steps in the reverse order.

The above rotation part 603 and the above angle locking mechanism 604 are not limited thereto. Said differently, the configuration is sufficient when the hand grip portion 602 is folded in the orthogonal direction and the folded hand grip portion 602 is fixed to be in the horizontal state. For example, this configuration may be realized by a clutch mechanism or a stopper mechanism including a locking claw for locking or an engaging claw for engaging.

Referring to FIG. 8, the projector 20 is mounted on the upper surface of the hand grip portion 602. In the procedures of a height adjusting operation and an angle adjusting operation of the projector 20 of the second embodiment, at first, a locking release operation of the second angle locking mechanism 604 is performed, and the hand grip portion 602 is folded in the orthogonal direction and fixed. Referring to FIG. 8, the hand grip portion 602 is folded in the left direction (the projection direction). Then, the gripping part 601 is moved up to be at a predetermined height position of the projector 20, and is fixed to the predetermined height position by the second height locking mechanism 620.

Next, the elevating part 72 and the projector 20 are moved up and down by the elevating mechanism 70. The height positions of the elevating part 72 and the projector 20 are fixed by the first height locking mechanism 80. The projector 20 is turned by about 90 degrees by the angle adjusting mechanism 90. The projector 20 is mounted on the upper surface of the hand grip portion 602 so as to be supported. Thereafter, the projector 20 is fixed to the above height and angle by the first angle locking mechanism 93.

Within the second embodiment, the hand grip portion 602 is folded from the vertical position at the right angle so that the projector 20 can be mounted on the hand grip portion 602. Therefore, the weight of the projector 20 is distributed to the supporting rod 600 and the elevating mechanism 70. As a result, the projector 20 can be stably supported, and therefore the projection image on the projection surface is stabilized so as to be easily viewed.

Third Embodiment

Figure 9A:
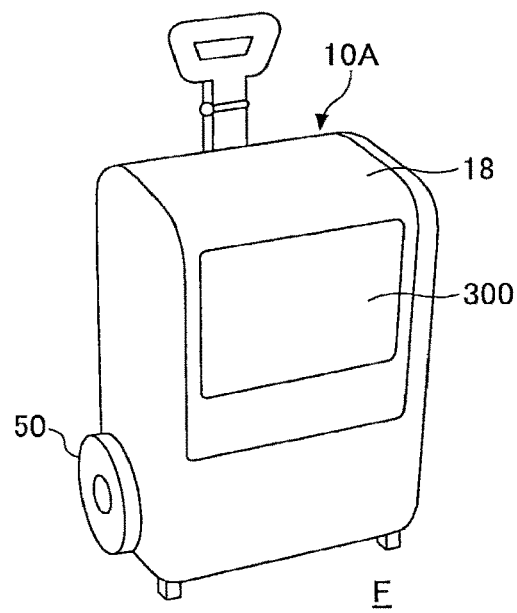
FIG. 9B perspectively illustrates an exemplary storage case provided with a display part.
Figure 9B:
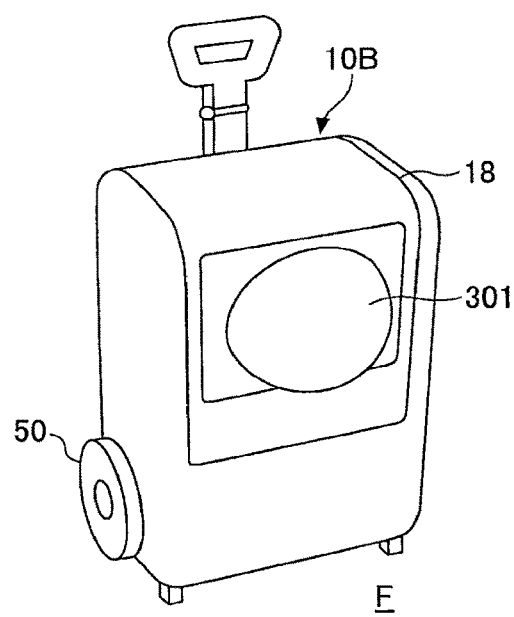
Figure 10A:
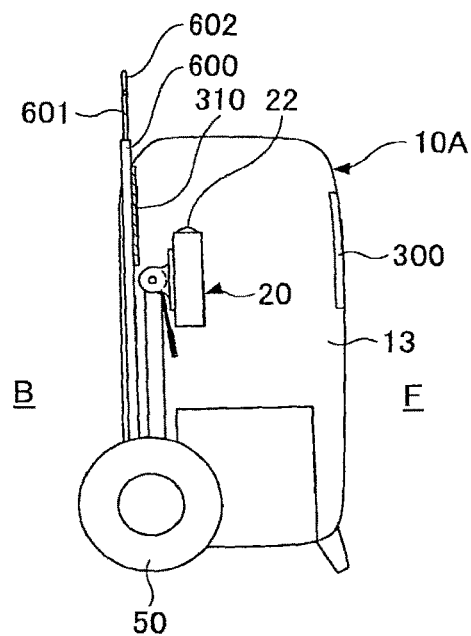
FIG. 10A is a side view illustrating an operation of a reflection plate provided in a storage space.
Figure 10B:
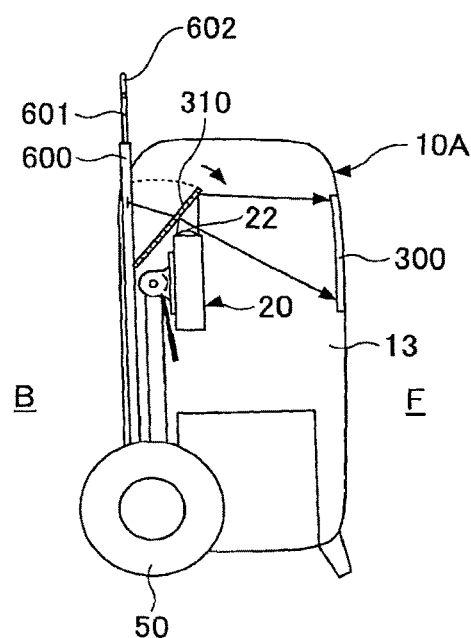
FIG. 10B is a side view illustrating the operation of the reflection plate provided in the storage space.
Figure 11A:
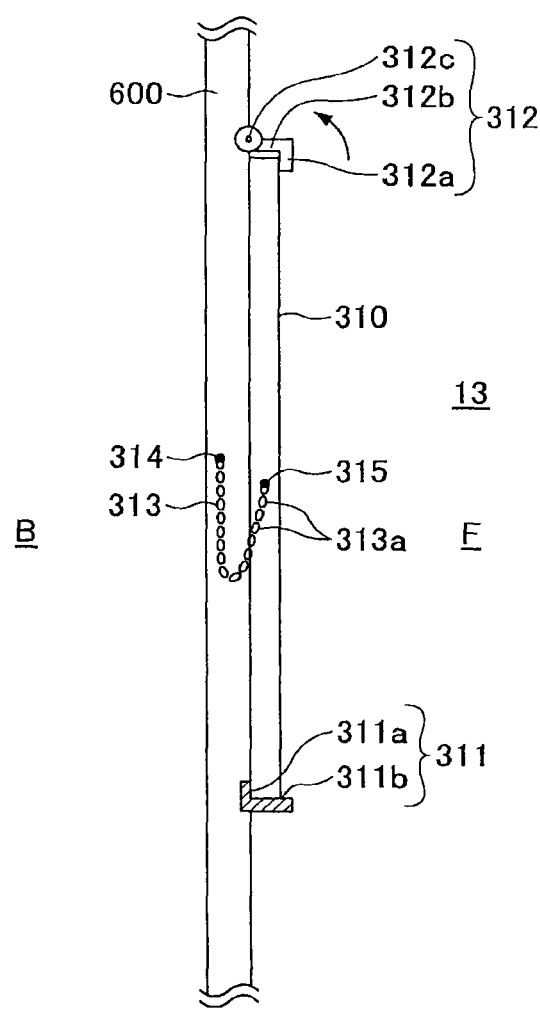
FIG. 11A is a partially enlarged side view of the reflection plate illustrated in FIG. 10A.
Figure 11B:
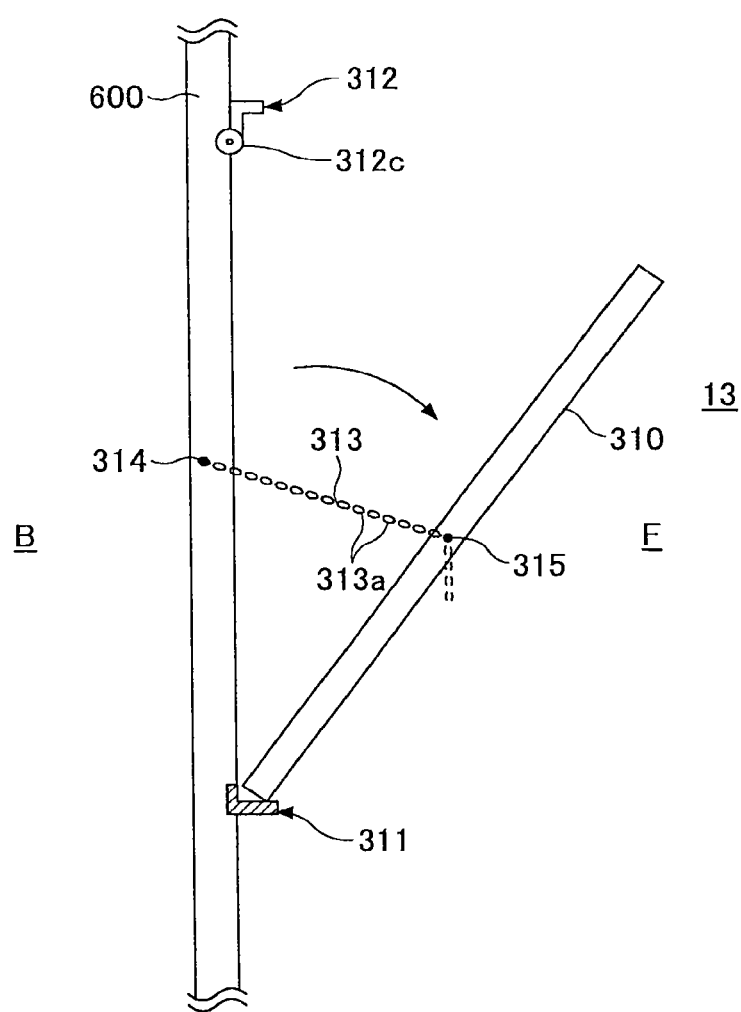
FIG. 11B is a partially enlarged side view of the reflection plate illustrated in FIG. 10B.

Referring to FIGS. 9A to 11B, a third embodiment of the present invention is described. Referring to FIGS. 9A and 9B, an example of a storage case provided with a display part is illustrated. FIGS. 10A and 10B illustrate side views of a configuration in which the projector is being accommodated in the storage case having a display part. FIGS. 11A and 11B are partly enlarged side views illustrating an exemplary operation of a reflection plate provided inside a storage space of a storage case.

Within the third embodiment, the elevating mechanisms, the locking mechanisms, and the angle adjusting mechanisms of the first and second embodiments are included and are based on the technical idea substantially similar to those of the first and second embodiments. Therefore, features different from the first and second embodiments are specifically described.

The features different from those of the first and second embodiments are existence of display parts 300 and 301, to which the projection image can be projected from the accommodated projector 20, on the front surface side F of the storage case 10. The features further include existence of a reflection plate 310, through which the projection image can be projected from the accommodated projector 20 to the display part 300. The reflection plate 310 is a mirror or a metallic plate having a reflection surface.

FIG. 9A illustrates a storage case 10A provided with the display part 300. FIG. 9B illustrates a storage case 10B provided with the display part 301.

The display parts 300 and 301 are display screens made of a white colored or opaque acrylic plate, ground glass, or the like. However, it is sufficient to be able to view the projection image from the front surface side F. Referring to FIG. 9A, the display surface of the display part 300 is plane and is provided inside the cover body 18. However, the display part 300 is not limited thereto.

Referring to FIG. 9B, the display part 301 is a display screen in a spherical form. The display part 301 is effective at a time of projecting contents whose theme is, for example, the earth or the cosmos.

Next, referring to FIGS. 10A, 10B, 11A, and 11B, described is the configuration of the reflection plate 310 for projecting a projection image to the display parts 300 and 301 in a state where the projector 20 is accommodated in the storage case 10.

FIGS. 10A and 11A are side views illustrating the storage case 10A including the display part 300 in a state before projection. FIGS. 10B and 11B are side views illustrating a state where the projection image is projected to the display part 300. In the storage case 10B including the display part 301, the configuration is the same. Therefore, explanation is omitted.

The reflection plate 310 is specifically a mirror, which is attached inside the storage case 10 and along a upper side surface of the supporting rod 600 on the front surface side F. The shape of the reflection plate 310 may be plane or a concave mirror. The reflection plate 310 is attached to the supporting rod 600 and is configured to retract from a route of moving up and down the projector 20 when the projector 20 is moved up and down.

Referring to FIG. 11A, the reflection plate 310 is fixed to the supporting rod 600 formed like a quadrangular prism by a first fixing part 311 and a second fixing part 312. The first fixing part 311 is provided on the front surface side F of the supporting rod 600 and supports the lower end portion of the reflection plate 310. The second fixing part 312 is provided on the front surface side F of the supporting rod 600 and supports the upper end portion of the reflection plate 310. The first fixing part 311 is an angle member and includes a vertical portion 311a and a horizontal portion 311b. The vertical portion 311a is joined to the supporting rod 600. The lower end surface of the reflection plate 310 is mounted on the upper surface of the horizontal portion 311b.

The second fixing part 312 is an angle member and includes a vertical portion 312a, a horizontal portion 312b, and a rotation part 312c for turning the second fixing part 312. The rotation part 312c is provided at a base end portion of the second fixing part 312. The rotation part 312c is connected to the supporting rod 600 so as to be able to turn relative to the supporting rod 600.

Further, the supporting rod 600 and the reflection plate 310 are connected by a chain 313 including multiple ring parts 313a. The chain 313 is attached to a predetermined height of the side surface of the supporting rod 600 by a screw 314 provided at a base end of the chain 313. Further, the ring part 313a positioned at a tip end portion of the chain 313 is hung on a screw 315 provided on the side surface or a back surface of the reflection plate 310 so as to connect the chain 313 to the reflection plate 310. This chain 313 has a function of adjusting the reflection angle of the reflection plate 310. This point is described below.

Next, a procedure of projecting the projection image from the accommodated projector 20 onto the display part 300 using the above reflection plate 310 is explained.

At first, in order to cancel an accommodated state of the reflection plate 310 installed along the supporting rod 600, the second fixing part 312 is upward rotated by the rotation part 312c as illustrated in FIG. 11A, and the upper edge portion of the reflection plate 310 is forward inclined as illustrated in FIGS. 10B and 11B. Because the chain 313 connects the reflection plate 31 to the supporting rod 600, the reflection plate 310 does not fall down.

In a case where the projection image is projected from the accommodated projector 20 to the display part 300, because the projection section 22 upward directs, the projection image needs to be reflected by the reflection plate 310 to have a proper angle and projected onto the display part 300.

The chain 313 is configured to properly adjust the inclination angle of the reflection plate 310. Said differently, the chain 313 includes the multiple ring parts 313a through which the screw 315 can be inserted. Therefore, by changing the position of the ring part 313a of the chain 313, through which the screw is inserted, the distance between the supporting rod 600 and the reflection plate 310 is adjusted so as to adjust the inclination angle of the reflection plate 310.

Referring to FIG. 10B, it is possible to project the projection image from the projection section 22 onto the display part 300 after reflecting at an appropriate angle. The projector 20 has a function of adjusting the projection image so that the projection image is correctly displayed at a time of projecting onto the display part 300. For example, an adjustment such as focusing on the display part 300 by a mechanism of adjusting a lens installed in the projection section 22 is performed.

When the reflection plate 310 is accommodated or the projector 20 is moved up and down, the reflection plate 310 is vertically moved up so as to be in a position retracted from the route of moving up and down the projector 20 as illustrated in FIG. 11A. Then, the rotation part 312c is rotated down so that the horizontal portion 312b is mounted on the upper end surface of the reflection plate 310 and the vertical portion 312a supports the upper edge portion of the reflection plate 310. Thus, the retracted state can be maintained.

As described above, the storage case 10A (including the storage case 10B) of the third embodiment is provided with the display part 300 (including the display part 301) on the front surface side F, and the reflection plate 310 is provided inside the storage space 13. Therefore, it becomes possible to project the projection image while accommodating the projector 20. Therefore, contents can be rapidly and effectively projected onto the display part 300 at a location without the projection surface 100 or a case where a state of the projection image is required to be immediately checked. Further, by using a spherical display part 301, it is possible to further fantastically project contents of a theme such as the cosmos and the earth.

The above elevating mechanism 70 is configured to be manually operated. However, the above elevating mechanism 70 may be configured to be automatically moved up and down. For example, a drive means for driving the elevating mechanism and a control means for driving or stopping the drive means may be disposed to enable the elevating mechanism to move up and down.

According to the embodiments of the present invention, the projector can be appropriately supported at the projection height and the projection direction in the place where the storage case is installed by the elevating mechanism provided inside the storage space and the adjusting mechanism adjusting the projection direction.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although a storage case has been described in detail, it should be understood that various changes, substitutions, and alterations could be made thereto without departing from the spirit and scope of the invention.

What is claimed is:

1. A storage case comprising:
    a storage space to accommodate a projector;
    a cover body to open or close an upper opening of the storage space;
    an elevating mechanism in the storage space and to move the projector up and down;
    an adjusting mechanism to adjust a projection direction of the projector moved up by the elevating mechanism;
    a supporting rod; and
    a gripping part in the supporting rod, the gripping part having a length in a direction of moving the projector move up and down relative to the supporting rod, the gripping part to be gripped by a user and to support a part of the projector.

2. The storage case according to claim 1, wherein the adjusting mechanism includes:
    a bracket to support the projector;

a rotation part to adjust the projection direction of the projector supported by the bracket; and a first angle locking mechanism to fix the projector to a position, to which the projector is rotated by the rotation part.

3. The storage case according to claim 1, wherein the elevating mechanism includes:

an elevating part connected to the adjusting mechanism and to move in upward and downward directions; and a first height locking mechanism to fix the elevating part when the projector moves up to a predetermined height position.

4. The storage case according to claim 1, further comprising:

a wheel at a bottom part of the storage case;

the supporting rod vertically extending on a back surface side of the storage case; and the gripping part to move up and down relative to the supporting rod.

5. The storage case according to claim 4, wherein an upper end part of the gripping part includes:

a hand grip to fold in an orthogonal direction relative to the supporting rod and support the projector so that the projector is mounted on an upper surface of the folded hand grip;

a rotation part enabling the hand grip to fold; and a second angle locking mechanism to fix the rotation part of the hand grip.

6. The storage case according to claim 1, further comprising:

a display part at a front surface of the storage case and to receive an image from the projector to form a projection image.

7. The storage case according to claim 6, wherein the display part is a planer or spherical display screen.

8. The storage case according to claim 6, wherein the storage space of the storage case includes a reflecting surface to cause the projection image from the projector to be reflected toward the display part.

9. The storage case according to claim 8, wherein the reflecting surface is retracted from a path of moving up and down the projector when the projector is moved up and down.

10. The storage case according to claim 1, wherein the storage space includes:

a first storage room for accommodating the projector; and a second storage room for accommodating a battery for supplying electric power to the projector.

11. The storage case according to claim 1, wherein an upper end part of the gripping part includes:

a hand grip to fold in an orthogonal direction relative to the supporting rod and support the projector so that the projector is mounted on an upper surface of the folded hand grip;

a rotation part enabling the hand grip to fold; and a second angle locking mechanism to fix the rotation part of the hand grip.

12. A storage case, comprising:

a storage space to accommodate a projector;

a cover body to open or close an upper opening of the storage space;

an elevating mechanism in the storage space and to move the projector up and down; and an adjusting mechanism to adjust a projection direction of the projector moved up by the elevating mechanism, the adjusting mechanism including:

a bracket to support the projector;

a rotation part to adjust the projection direction of the projector supported by the bracket; and a first angle locking mechanism to fix the projector to a position, to which the projector is rotated by the rotation part.

13. A storage case, comprising:

a storage space to accommodate a projector;

a cover body to open or close an upper opening of the storage space;

an elevating mechanism in the storage space and to move the projector up and down;

an adjusting mechanism to adjust a projection direction of the projector moved up by the elevating mechanism;

a wheel at a bottom part of the storage case;

a supporting rod vertically extending on a back surface side of the storage case; and a gripping part to move up and down relative to the supporting rod, wherein an upper end part of the gripping part includes:

a hand grip to fold in an orthogonal direction relative to the supporting rod and support the projector so that the projector is mounted on an upper surface of the folded hand grip;

a rotation part enabling the hand grip to fold; and a second angle locking mechanism to fix the rotation part of the hand grip.

* * * * *